United States Patent [19]
Friedrichs

[11] Patent Number: 6,005,517
[45] Date of Patent: Dec. 21, 1999

[54] TEST VEHICLE TRACKING SYSTEM

[75] Inventor: H. Peter Friedrichs, Tucson, Ariz.

[73] Assignee: Chrysler Corporation, Auburn Hills, Mich.

[21] Appl. No.: 08/843,182

[22] Filed: Apr. 14, 1997

[51] Int. Cl.⁶ .................................................. G01S 3/02
[52] U.S. Cl. ........................ 342/457; 340/991; 701/213
[58] Field of Search .................................. 342/457, 357; 340/991; 701/213

[56] References Cited

U.S. PATENT DOCUMENTS

| H1288 | 2/1994 | Lusk . | |
|---|---|---|---|
| 3,714,649 | 1/1973 | Brouwer et al. . | |
| 3,991,485 | 11/1976 | Golenski . | |
| 4,379,340 | 4/1983 | Holtley et al. . | |
| 4,523,192 | 6/1985 | Burton et al. . | |
| 4,550,444 | 10/1985 | Uebel . | |
| 4,759,735 | 7/1988 | Pagnol et al. . | |
| 4,764,769 | 8/1988 | Hayworth et al. . | |
| 4,857,886 | 8/1989 | Crews . | |
| 5,184,694 | 2/1993 | Magrath, Jr. et al. . | |
| 5,194,843 | 3/1993 | Jones . | |
| 5,278,563 | 1/1994 | Spiess . | |
| 5,347,456 | 9/1994 | Zhang et al. . | |
| 5,504,491 | 4/1996 | Chapman | 342/357 |
| 5,543,798 | 8/1996 | Schuermann . | |
| 5,548,291 | 8/1996 | Meier et al. . | |
| 5,742,915 | 4/1998 | Stafford | 701/35 |
| 5,861,841 | 1/1999 | Gildea et al. | 342/357 |

*Primary Examiner*—Mark Hellner
*Attorney, Agent, or Firm*—Roland A. Fuller III

[57] ABSTRACT

A system for recording vehicle data from vehicles traversing a test track includes a plurality of locator beacons buried in respective well casings around the test track for transmitting location signals. Each beacon includes a transmitter and a microprocessor that controls the transmitter. Receivers are disposed in the test vehicles for receiving the location signals as the vehicles pass by the beacons, and a respective computer receives the position signals from each receiver and formats the signals as appropriate for the vehicle's onboard flight recorder. Then, after checking for signal fidelity the computer sends each signal to the flight recorder, which time stamps the position signals along with other data collected from the vehicle. In this way, data can be correlated to particular segments of the test track.

20 Claims, 4 Drawing Sheets

Transmitter dipole antenna

Transmitter instrumentation

Beacon μP logic

| Actual temp. | Max. temp. | Min. temp. | Batt. volt. | Min. volt. | Max. volt. | Beacon address | Beacon address | Beacon address | Check sum |
|---|---|---|---|---|---|---|---|---|---|

TEST VEHICLE TRACKING SYSTEM

FIELD OF INVENTION

The present invention relates generally to vehicle test systems, and more particularly to systems and methods for ascertaining and recording the positions of test vehicles on a test track.

BACKGROUND OF THE INVENTION

Vehicle manufacturers test vehicles by operating the vehicles over test tracks. As a vehicle traverses the track, various parameters of the vehicle are sensed and recorded. For example, vehicle speed, shock absorber temperature, axle impact energies, and so on can be measured by sensors and recorded by a flight recorder onboard the vehicle. After testing, the data can be retrieved from the flight recorder and analyzed to assess the performance and construction of the vehicle.

Typically, to increase the diversity of road surfaces over which the vehicles are tested and to thereby promote comprehensive vehicle testing, the surface of a test track will vary around the track. For example, the surface can vary from conventional asphalt to bumps, then gravel, and so on.

It is advantageous that data obtained from dissimilar surfaces not be mixed. By not mixing the data, post-test analysis can be more rigorous and detailed in pinpointing potential design issues. Accordingly, it is desirable that the position of a test vehicle on a track be recorded along with the test data, so that the various data recordings can be correlated to the portion of the track over which the data was collected.

Unfortunately, existing vehicle position sensing systems have several drawbacks. For example, obtaining vehicle position data over time using navigation satellites is possible, but unless comparatively expensive satellite navigation systems are used, satellite systems render positional data with a precision that is insufficient for test track applications. Further, satellite navigation systems use a radiofrequency that requires line-of-sight communication be established between the satellite and the vehicle's satellite receiver, thus undesirably necessitating the use of an expensive, external antenna on the vehicle. Still further, the output of navigation satellite systems is rendered in terms of latitude and longitude, which must be converted to test track coordinates to be useful. Such conversion undesirably complicates the test analysis. Likewise, existing terrestrial position systems are expensive, and their performance is unreliable, rendering them inadequate for prolonged test track use.

Accordingly, the present invention recognizes the need to provide a low-cost, reliable vehicle position system for a vehicle test track. Moreover, the present invention recognizes that such a system advantageously should be easily maintained. And, the present invention recognizes that fixed position beacons in such a system transmit data efficiently, using a simple, low-cost, easily maintained transmitter system. Additionally, the present invention recognizes that such a system be compatible with a large number of existing vehicle flight recorders. Accordingly, it is an object of the present invention to provide a test vehicle tracking system for a vehicle test track. Another object of the present invention is to provide a test vehicle tracking system for a vehicle test track that is reliable and inexpensive. Still another object of the present invention is to provide a test vehicle tracking system for a vehicle test track that can be used with a large number of flight recorders, without requiring excessive hardware modification to either the flight recorder or the tracking system. Yet another object of the present invention is to provide a test vehicle tracking system that transmits binary data without requiring excessive signal coding hardware. Another object of the present invention is to provide a test vehicle tracking system that is easy to use and cost-effective.

SUMMARY OF THE INVENTION

A vehicle test system is disclosed for recording vehicle data from vehicles traversing a test track. The system includes a plurality of locator beacons juxtaposed with the test track for transmitting location signals, with each beacon including a transmitter and a microprocessor controlling the transmitter.

Each beacon transmits a signal that is unique to the beacon, so that passing vehicles can detect beacon transmissions to deduce the location of the vehicle.

Also, the system includes a plurality of at least partially buried well casings. Each well casing holds a respective beacon and has an open top end. The top end of each well casing is selectively covered by a cap. With this structure, the beacon is protected from environmental extremes of temperature and precipitation, and the beacon is also protected from damage by passing vehicles. Moreover, the effective gain and radiation characteristics of the beacon can be established by appropriately establishing the depth at which the well casing is buried.

In addition, at least one receiver is disposable in a test vehicle on the test track for receiving the location signals as the receiver passes by the beacons, and a computer is in communication with the receiver for receiving position signals therefrom. A flight recorder records vehicle parameters, with the flight recorder being in communication with the computer for receiving position signals therefrom and correlating the position signals with the vehicle parameters over time. In accordance with the present invention, the computer is programmed to output position signals to the flight recorder in accordance with the communication protocol of the flight recorder.

In a preferred embodiment, for each beacon, the microprocessor keys the transmitter to effect transmission of the position signals in lieu of a modem. Each beacon preferably includes a battery connected to the transmitter and the microprocessor for energizing the battery and microprocessor, and each beacon is associated with at least one solar cell for charging the battery. Moreover, each beacon further includes a temperature sensor that generates a temperature signal and a battery voltage sensor that generates a battery voltage signal. The temperature signal and the battery voltage signal are sent to the microprocessor for transmission thereof in the position signal. Then, the position signals from each receiver are sent to a low pass filter and then to a discriminator, prior to being sent to the computer.

With the above structure, a maintenance technician can drive past the beacons and intercept the voltage and temperature signals to thereby easily and efficiently assess the condition of the beacons, to determine whether maintenance is required. Or, the vehicle flight recorders can record the temperature and voltage information and then a technician can subsequently download the information from the flight recorders after the test vehicles have stopped.

To facilitate blocking false or poor signals, each position signal includes plural beacon address bytes, and a position signal is not sent by the computer to the flight recorder when one address byte differs from another address byte in the position signal. And, each position signal includes a transmitted check sum. The computer determines a received check sum based on the position signal, and the computer does not send the position signal to the flight recorder when the transmitted check sum does not equal the received check sum.

In another aspect, in vehicle test system, a plurality of position beacon assemblies are disposed along a predetermined route for generating respective position signals. Each position signal is representative of the beacon assembly that transmitted it, and each position beacon assembly includes a transmitter, and a well casing at least partially buried. The well casing is formed with an open top end for receiving the transmitter therethrough. A closure is selectively engageable with the well casing for covering the top end.

In yet another aspect, a computer program device medium includes a computer program storage device readable by a digital processing system and a means on the program storage device and embodying logic means recognizable by the digital processing system for performing method steps for generating position signals representative of a beacon and the temperature thereof. The medium includes logic means for determining whether the temperature is outside of a temperature range. Also, logic means update the temperature range when the temperature is outside the range. Further, logic means are provided for generating a position signal representative of the temperature, the temperature range, and the logical address of the beacon.

In still another aspect, a computer program device medium for performing method steps for sending, to a vehicle flight recorder, received position signals including plural transmitter beacon address bytes and at least one transmitted check sum, includes logic means for determining when a complete position signal is received. Also, logic means determine a received check sum based on the position signal, and logic means are provided for determining whether the value of any beacon address byte is different from the value of any other beacon address byte in the position signal. Moreover, logic means are provided for sending the position signal to the flight recorder only when the received check sum equals the transmitted check sum and when no beacon address byte value is different from any other beacon address byte value.

In another aspect, in a vehicle test system, a plurality of vehicle receiving systems are positionable in respective vehicle for receiving, as each vehicle traverses a test track, position signals from stationary beacons which are juxtaposed with the test track. As disclosed in detail below, each receiving system includes a receiver for receiving the position signals and a flight recorder for recording vehicle data over time as the vehicle traverses the test track. A computer receives position signals from the receiver, and the computer generates an output signal representative of the position signals. The computer formats the output signal in accordance with the communication protocol of the flight receiver.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
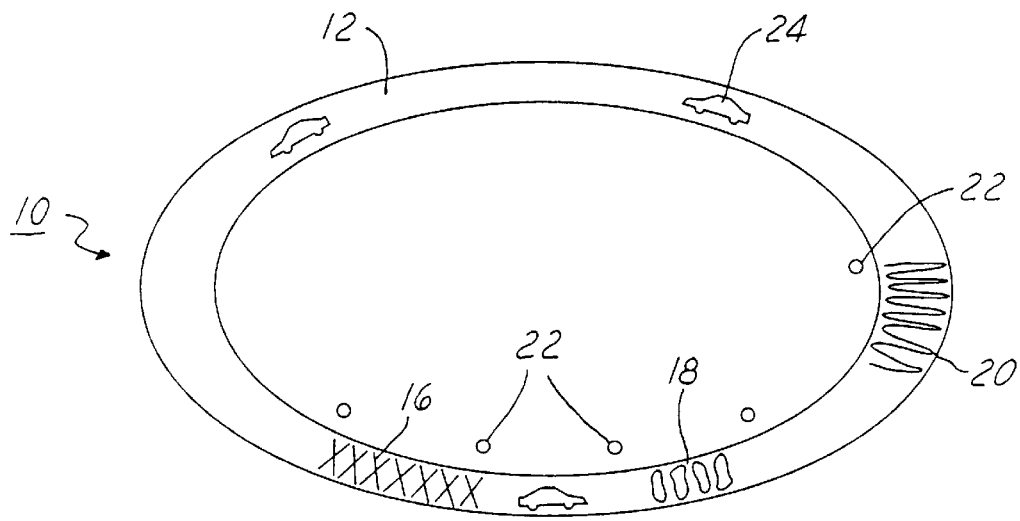
FIG. 1 is a schematic diagram of a test track of the present invention.

Referring initially to FIG. 1, a vehicle test system is shown, generally designated 10, which includes a test track 12 having various surface segments, e.g., an asphalt surface segment 14, a gravel surface segment 16, a bump surface segment 18, and a ridged surface segment 20. A plurality of position transmitter beacon assemblies 22 are fixedly juxtaposed with the track around the perimeter thereof, and as shown the beacon assemblies 22 advantageously are positioned between the various segments 14–20 of the test track. One or more test vehicles 24 can be driven around the track 12 as shown to receive signals from the beacons 22 and thereby correlate data collected by flight recorders that are onboard the vehicles 24 with the various segments 14–20 of the test track 12.

Figure 2:
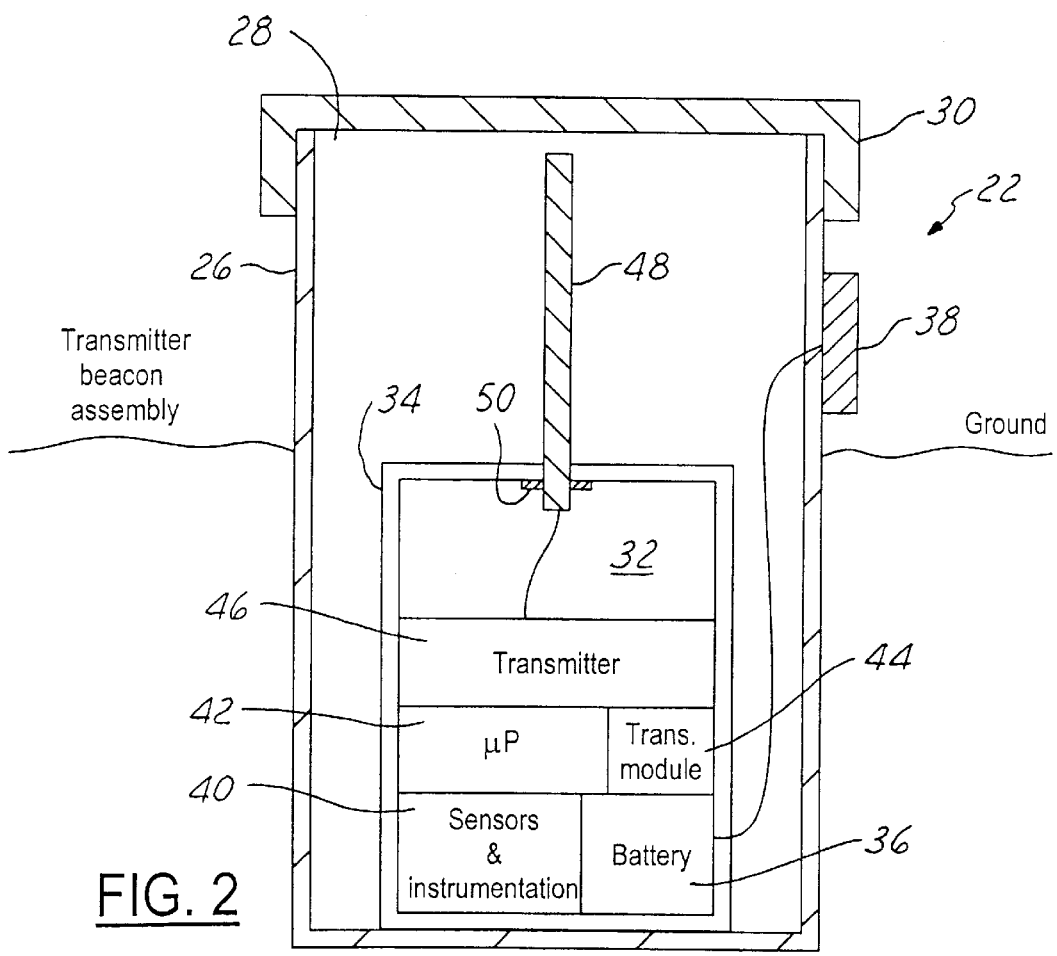
FIG. 2 is a partial cross-sectional view of a transmitter beacon assembly of the present invention.

FIG. 2 shows the details of a beacon assembly 22. A plastic hollow well casing 26 includes an open top end 28 that is selectively covered by a cap 30. The cap 30 engages the well casing 26 in an interference fit, such that the cap 30 can be easily removed from the well casing 26 to expose the interior thereof. As shown in FIG. 2, the well casing 26 is partially buried in the ground, with a portion of the well casing 26 protruding from the ground.

A beacon 32 is disposed in the well casing 26. The beacon 32 includes a hollow plastic housing 34 that holds the electrical components of the beacon 32. These components include a battery 36, preferably a lead acid gel-cell or eight "D" cells. To recharge the battery 36 and prolong its life, a solar panel 38 can be attached to the casing 26 above ground or otherwise associated with the assembly 22, and the solar panel 38 electrically connected to the battery 36 as shown. In one presently preferred embodiment, the solar panel 38 is made by Solarex and the gel-cell battery 36 is made by Panasonic.

Additionally, sensors and instrumentation 40 are disposed in the beacon 32, and are more fully disclosed below. Moreover, the beacon 32 includes a microprocessor 42 that is programmed with a software-implemented transmitter module 44, the operation of which is disclosed below. The microprocessor 42 controls a radiofrequency amplitude modulated (AM) transmitter 46, and the microprocessor 42 and transmitter 46 are both energized by the battery 36. in the presently preferred embodiment, the microprocessor 42 is a Basic Stamp II microprocessor made by Parallax, and the transmitter 46 is a type TX-66 310 MHz transmitter made by Ming Electronics.

In turn, the transmitter 46 is electrically connected to an antenna 48 as shown. The antenna 48 is attached to the housing 34 of the beacon 32 by suitable means, e.g., by threadably engaging the antenna 48 (or an adaptor associated therewith) with a fastener 50 on the housing 34. As shown, the antenna 48 extends above ground level within the well casing 26.

Figure 3:
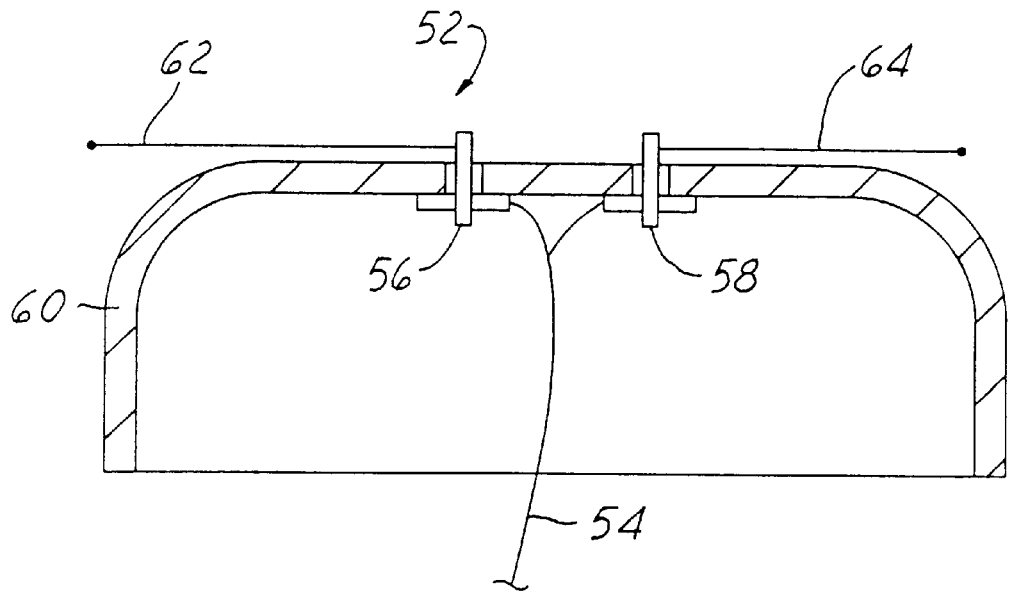
FIG. 3 is a cross-sectional view of an alternate beacon that uses a dipole antenna, with portions of the beacon broken away.

The antenna 48 shown in FIG. 2 is a monopole antenna. If desired, to effect beam directionality and thereby reduce cross-talk between adjacent beacons 32, a dipole antenna 52 (FIG. 3) can be used. As shown, a coaxial cable 54 is connected to a transmitter (not shown) and to two connectors 56, 58, each of which extend through a housing 60 of a beacon that is in all other essential respects identical to the beacon 32 shown in FIG. 2. Wire loops 62, 64 are attached to respective connectors 56, 58 to establish the dipole antenna 52.

Figure 4:
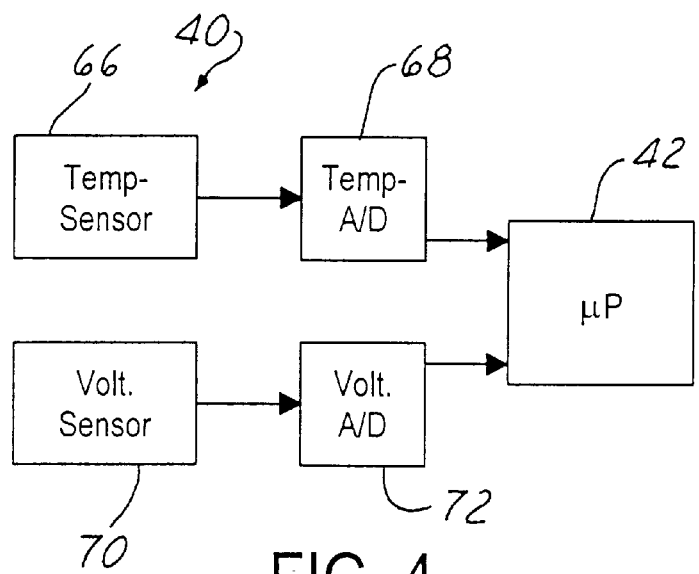
FIG. 4 is a block diagram of the instrumentation of a transmitter beacon.

FIG. 4 shows that the transmitter instrumentation 40 includes a temperature sensor 66, preferably a type LM35 sensor integrated circuit, for sensing the temperature inside the housing of the beacon 32. The temperature sensor 66 generates a temperature signal which is digitized by an analog to digital converter (ADC) 68, and then sent to the microprocessor 42. Additionally, the transmitter instrumentation 40 includes a battery voltage sensor 70 which is connected to the battery 36 for sensing the voltage thereof. The voltage sensor 70 generates a voltage signal which is digitized by an ADC 72, and then sent to the microprocessor 42.

Figures 5, 6:
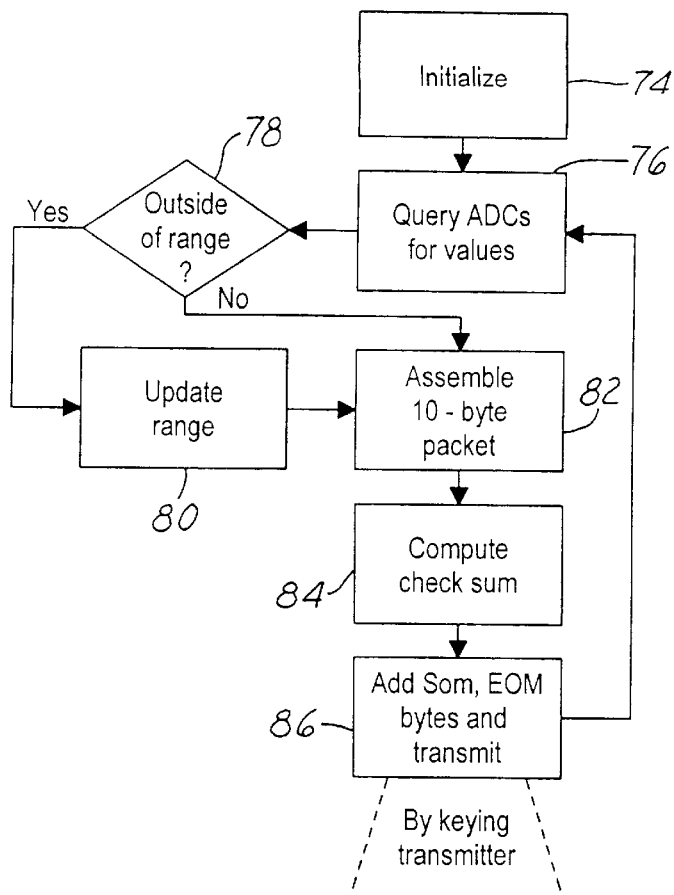
FIG. 5 is a flow chart of the logic of the beacon microprocessor.
FIG. 6 is a schematic diagram of a position signal of the present invention.
Figure 8:
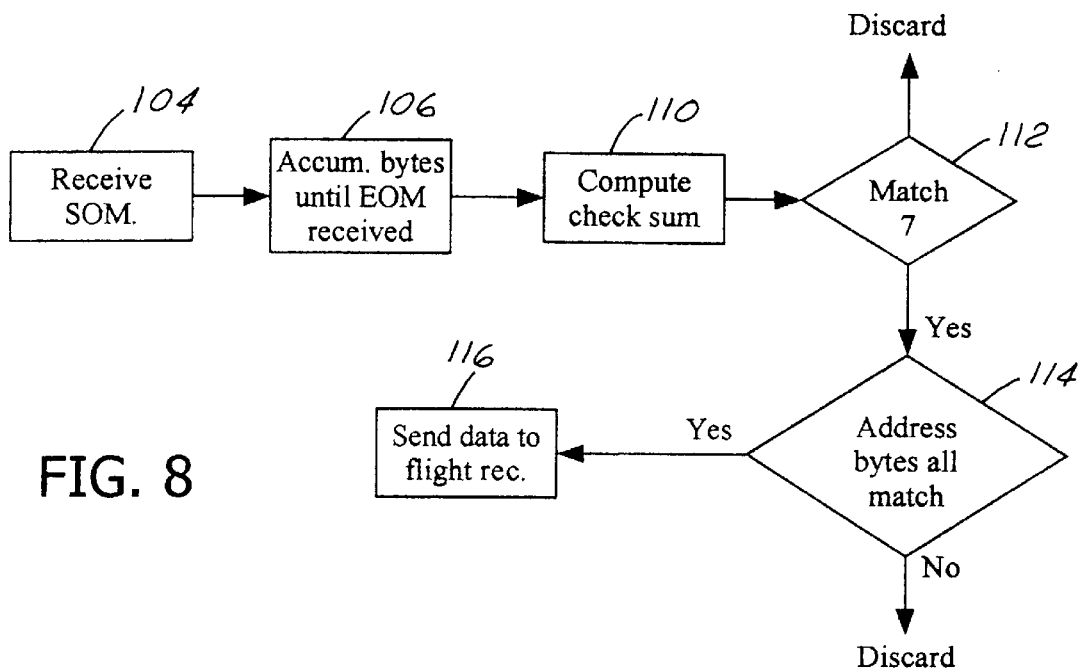
FIG. 8 is a flow chart of the logic of the receiver computer.

FIG. 5 shows the logic of the transmitter module 44. It is to be understood that the transmitter module 44, like the receiver module 100 discussed further below in reference to FIG. 8, is implemented on a device medium. In one embodiment, the device medium is implemented by logic circuits on a chip in the computer 14. Alternatively, the module 44 can be implemented by a circuit board (not shown), and the operative components of the module 44 accordingly would be electronic components on the circuit board.

It is to be still further understood that the operations of the modules 42, 44 described below in reference to FIGS. 5 and 8 could be embodied in a device medium such as software, i.e., in machine-readable form and stored on a computer program storage device. In other words, FIGS. 5 and 8 illustrate the structures of the modules of the present invention as might be embodied in computer program software or in logic circuits. Those skilled in the art will appreciate that FIGS. 5 and 8 illustrate the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures.

When embodied in software, these instructions may reside on a program storage device including a data storage medium, such as can be found on a computer floppy diskette, on semiconductor devices, on magnetic tape, on optical disks, on a DASD array, on magnetic tape, on a conventional hard disk drive, on electronic read-only memory or on electronic random access memory, or other appropriate data storage device. In an illustrative embodiment of the invention, the computer-executable instructions may be lines of compiled PBasic language code. In any case, apart from the particular computer program storage device (i.e., firmware logic circuits or software) that embodies the module 44 as intended by the present invention the module 44 establishes a program means which embodies logic means that are recognizable by the microprocessor 42 to perform the method steps disclosed below.

At block 44 the logic initializes, and then proceeds to block 76 to query the ADCs 68, 72 for the temperature and voltage signals, respectively. Moving to decision diamond 78, the logic determines whether either signal is outside of its previous range. If so, the logic moves to block 80 to update the range of the respective signal as appropriate. In other words, if it is determined at decision diamond 78 that a signal has set a new high or a new low, the high or low setpoint of the parameter, as appropriate, is set at the current signal value.

From block 80, or from decision diamond 78 if the test there was negative, the logic moves to block 82 to assemble a ten-byte position signal. An example of such a signal 73 is shown in FIG. 6. Referring briefly to FIG. 6, each position signal 32 includes three bytes respectively representative of beacon 32 temperature, and the maximum and minimum values which the beacon 32 temperature has in the past attained. Similarly, each position signal 32 includes three bytes respectively representative of battery 36 voltage, and the maximum and minimum values which the battery 36 voltage has in the past attained.

Moreover, each position signal 73 includes three beacon address bytes, with the values of each beacon address byte being identical to the value of the other address bytes in the position message 73. Lastly, the position signal 73 includes a check sum byte which is generated in accordance with check sum methods well-known in the art, as indicated at block 84 in FIG. 5.

Referring back to FIG. 5, from block 84 the logic moves to block 86. At block 86, the logic appends a start of message (SOM) byte and an end of message (EOM) byte to the position signal 73. After appending the SOM and EOM bytes, the logic of the microprocessor 42 causes the transmitter 46 to transmit the position message. About five position messages per second are generated, with a single temperature and voltage measurement sufficing for about fifty successive position signals.

In accordance with the present invention, at block 86 the microprocessor 42 pulses the transmitter 46 on to indicate a logical "1". In contrast, when a logical "0" is desired to be transmitted, the microprocessor 42 simply does not energize the transmitter 46. Accordingly, it may now be appreciated that the system 10 does not require the use of a frequency shift keying (FSK) mechanism to modulate the carrier generated by the transmitter 46 with first and second tone respectively representative of logical "1"s and "0"s; rather, the transmitter 46 is simply energized and deenergized, with its carrier frequency remaining unmodulated. From another viewpoint, the microprocessor 42 keys the transmitter 46 to effect transmission of the position signals in lieu of a modem.

As recognized by the present invention, such simplification, which saves both money and battery 36 energy, is made possible because the position signals are small packets of data that are repeatedly regenerated. The present invention understands that under these circumstances, although ambient noise might indeed degrade one position signal that is generated by the modemless means herein, the rapid succession of position signals immediately preceding and following the degraded signal ensures that at least some valid position signals will be received.

Now referring to FIG. 6, each test vehicle 24 includes an onboard receiver system 88. As shown, a receiver system of the present invention includes an antenna 90 connected to a receiver 92, it being understood that the receiver 92 is complementarily configured to the transmitter 46 shown in FIG. 2. The receiver 92 receives position signals from the beacons 22 as the vehicle 24 traverses the test track 14.

I have found that inductive vehicle 24 components such as door locks, power antennas and the like produce noise that can severely reduce the effectiveness of the receiver system 88. I have further discovered that the pulse width of the data pulses from the receiver 92 are significantly wider than the inductive noise pulses.

To overcome this problem, from the receiver 92, the present invention sends position signals to a low pass filter 94 and thence to an amplitude discriminator 96. Preferably, the low pass filter 94 is a second order Chebyshev filter having a cutoff frequency of 1200 Hz. The discriminator rejects all pulses that fail to reach its threshold voltage, which is empirically determined. Legitimate data pulses exceeding the threshold voltage are reconstructed and squared off.

Figure 7:
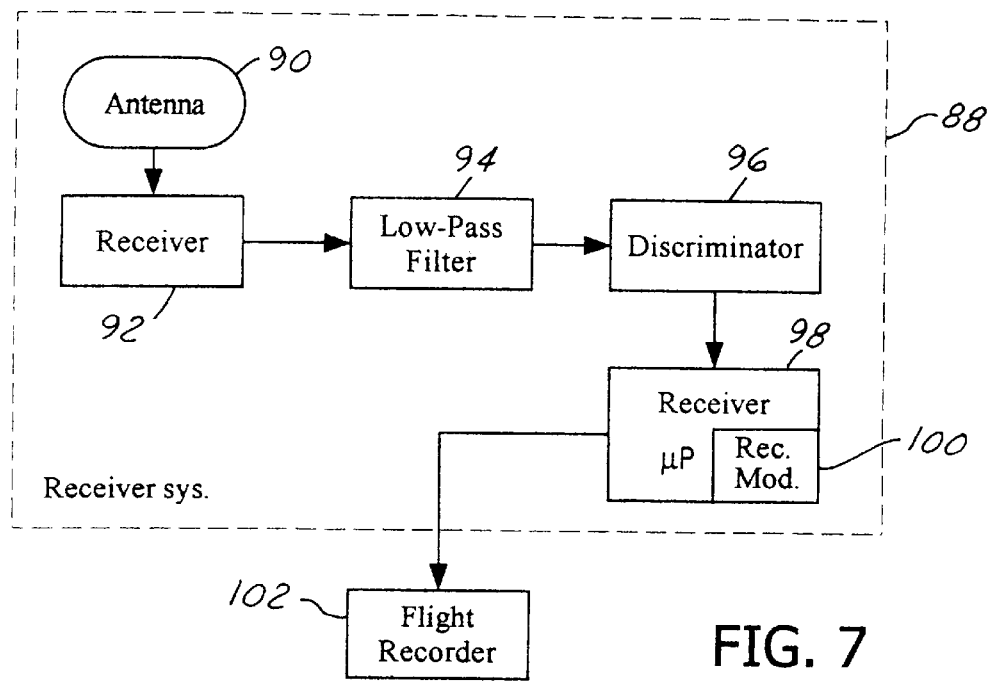
FIG. 7 is a block diagram of the instrumentation of an onboard vehicle receiver system.

Still referring to FIG. 7, from the discriminator 96 the processed position signals are sent to a receiver computer 98, which can be configured like the transmitter microprocessor 42. The receiver computer 98 is programmed with a software-implemented receiver module 100 for undertaking the logic shown in FIG. 8. From the computer 98, the position signals are sent to a flight recorder 102 that is also onboard the vehicle 24 for recording vehicle 24 operating parameters over time. That is, the flight recorder time-stamps the operating parameters, and then correlates the collected parameters with the position signals received from the receiver system 88.

Per the present invention, the flight recorder 102 can be any suitable flight recorder known in the art, and the computer 98 programmed to format the position signals as appropriate for the particular flight recorder 102. It is to be understood that the receiver system 88 can be energized by dc batteries or by an adaptor that is engageable with the cigarette lighter socket of the vehicle 24.

FIG. 8 shows the logic of the receiver module 100. Commencing at block 104, a SOM byte is received. Then, the logic moves to block 106, wherein bytes are accumulated until an EOM byte is received. When an EOM byte is received, the logic moves to block 110 to compute a check sum based on the received bytes of the position message.

At decision diamond 112, it is determined whether the value of the computer check sum matches the value of the check sum byte received at block 106. If not, an error is indicated, and the position message is discarded. On the other hand, if the check sums match, the process moves to decision diamond 114.

At decision diamond 114, it is determined whether all three address bytes received at block 106 match each other. If they do not, an error is indicated, and the position message is discarded. Otherwise, the logic moves to block 116 to format the position signal as appropriate for the particular flight recorder 102, and then to send the data to the flight recorder 102.

With the above disclosure in mind, it can be appreciated that the present receiver system 88 can be easily and cost-effectively configured through software for compatibility with a wide variety of flight recorders 102. For example, for flight recorders which receive parallel data bits over parallel input lines, the receiver module 100 can be programmed to simultaneously send bits of position signals over the input lines to the flight recorder. Or, the receiver module 100 can be programmed to send data serially to a serial data flight receiver. Still further, if desired the position signals can be output by the computer 98 as appropriate for effecting a square-wave audio format. Thus, the computer 98 generates an output signal representative of the position signals and formats the output signal in accordance with the communication protocol of the flight receiver 102.

While the particular TEST VEHICLE TRACKING SYSTEM as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A vehicle test system for recording vehicle data from vehicles traversing a test track, comprising:
   a plurality of locator beacons juxtaposed with the test track for transmitting location signals, each beacon including a transmitter and a microprocessor controlling the transmitter;
   a plurality of at least partially buried well casings, each well casing for holding a respective beacon, each well casing having an open top end;
   a plurality of caps, each cap being removably engaged with a respective well casing to cover the respective top end thereof;
   at least one receiver disposable in a test vehicle on the test track for receiving the location signals as the receiver passes by the beacons;
   a computer in communication with the receiver for receiving position signals therefrom; and
   a flight recorder for recording vehicle parameters, the flight recorder being in communication with the computer for receiving position signals therefrom and correlating the position signals with the vehicle parameters over time, the computer being programmed to output position signals to the flight recorder in accordance with the communication protocol of the flight recorder.

2. The system of claim 1, wherein for each beacon, the microprocessor keys the transmitter to effect transmission of the position signals in lieu of a modem.

3. The system of claim 1, wherein each beacon further comprises a battery connected to the transmitter and the microprocessor for energizing the battery and microprocessor.

4. The system of claim 3, wherein each beacon is associated with at least one solar cell for charging the battery.

5. The system of claim 4, wherein each beacon further comprises a temperature sensor generating a temperature signal and a battery voltage sensor generating a battery voltage signal, the temperature signal and the battery voltage signal being sent to the microprocessor for transmission thereof in the position signal.

6. The system of claim 5, wherein the position signals from each receiver are sent to a low pass filter and then to a discriminator, prior to being sent to the computer.

7. The system of claim 6, wherein each position signal includes plural beacon address bytes, and a position signal is not sent by the computer to the flight recorder when one address byte differs from another address byte in the position signal.

8. The system of claim 7, wherein each position signal includes a transmitted check sum, and wherein the computer determines a received check sum based on the position signal, and the computer does not send the position signal to the flight recorder when the transmitted check sum does not equal the received check sum.

9. In a vehicle test system, a plurality of position beacon assemblies disposed along a predetermined route for generating respective position signals, each position signal being representative of the beacon assembly that transmitted it, each position beacon assembly comprising:

a transmitter;

a well casing being at least partially buried, the well casing being formed with an open top end for receiving the transmitter therethrough; and a closure selectively engageable with the well casing for covering the top end.

10. The system of claim 9, wherein each beacon assembly further comprises:

a microprocessor for controlling the transmitter.

11. The system of claim 10, wherein for each beacon assembly, the microprocessor keys the transmitter to effect transmission of position signals in lieu of a modem.

12. The system of claim 10, wherein each beacon assembly further comprises a battery connected to the transmitter and the microprocessor for energizing the battery and microprocessor.

13. The system of claim 12, wherein each beacon assembly is associated with at least one solar cell for charging the battery.

14. The system of claim 13, wherein each beacon further comprises a temperature sensor generating a temperature signal and a battery voltage sensor generating a battery voltage signal, the temperature signal and the battery voltage signal being sent to the microprocessor for transmission thereof in the position signal.

15. A computer program device medium comprising:

a computer program storage device readable by a digital processing system; and a means on the program storage device and embodying logic means recognizable by the digital processing system for performing method steps for generating position signals representative of a beacon and the temperature thereof, comprising:

logic means for determining whether the temperature is outside of a temperature range;

logic means for updating the temperature range when the temperature is outside the range; and logic means for generating a position signal representative of the temperature, the temperature range, and the logical address of the beacon.

16. The computer program device medium of claim 14, wherein the position signal includes start of message and end of message bytes.

17. The computer program device medium of claim 15, wherein the logic means for generating generates plural address bytes, each address byte being identical to the other address bytes in the position signal.

18. A computer program device medium comprising:

a computer program storage device readable by a digital processing system; and a means on the program storage device and embodying logic means recognizable by the digital processing system for performing method steps for sending, to a vehicle flight recorder, received position signals including plural transmitter beacon address bytes and at least one transmitted check sum, comprising:

logic means for determining when a complete position signal is received;

logic means for determining a received check sum based on the position signal;

logic means for determining whether the value of any beacon address byte is different from the value of any other beacon address byte in the position signal; and logic means for sending the position signal to the flight recorder only when the received check sum equals the transmitted check sum and when no beacon address byte value is different from any other beacon address byte value.

19. In a vehicle test system, a plurality of vehicle receiving systems positionable in respective vehicles for receiving, as each vehicle traverses a test track, position signals from stationary beacons juxtaposed with the test track, each receiving system comprising:

a receiver for receiving the position signals, a flight recorder for recording vehicle data over time as the vehicle traverses the test track;

a computer for receiving position signals from the receiver, the computer generating an output signal representative of the position signals, the computer formatting the output signal in accordance with the communication protocol of the flight receiver, the computer including logic means for determining when a complete position signal is received;

logic means for determining a received check sum based on the position signal;

logic means for determining whether the value of any beacon address byte is different from the value of any other beacon address byte in the position signal; and logic means for sending the position signal to the flight recorder only when the received check sum equals the transmitted check sum and when no beacon address byte value is different from any other beacon address byte value.

20. The system of claim 18, wherein each receiving system further comprises:

a low pass filter for receiving an output of the receiver; and a discriminator for receiving an output of the low pass filter, the computer receiving an output of the discriminator.

* * * * *